US010921236B2

(12) United States Patent
Rottenberg (10) Patent No.: US 10,921,236 B2
(45) Date of Patent: Feb. 16, 2021

(54) INTEGRATED LENS FREE IMAGING DEVICE

(71) Applicant: IMEC VZW, Leuven (BE)

(72) Inventor: Xavier Rottenberg, Kessel-Lo (BE)

(73) Assignee: IMEC VZW, Leuven (BE)

( * ) Notice: Subject to any disclaimer, the term of this patent is extended or adjusted under 35 U.S.C. 154(b) by 98 days.

(21) Appl. No.: 16/318,293

(22) PCT Filed: Jul. 20, 2017

(86) PCT No.: PCT/EP2017/068430
§ 371 (c)(1),
(2) Date: Jan. 16, 2019

(87) PCT Pub. No.: WO2018/015517
PCT Pub. Date: Jan. 25, 2018

(65) Prior Publication Data
US 2019/0265153 A1  Aug. 29, 2019

(30) Foreign Application Priority Data
Jul. 20, 2016 (EP) .................................. 16180404

(51) Int. Cl.
*G01N 15/14* (2006.01)
*G03H 1/04* (2006.01)
*G03H 1/08* (2006.01)

(52) U.S. Cl.
CPC ..... *G01N 15/1468* (2013.01); *G01N 15/1436* (2013.01); *G03H 1/0443* (2013.01);
(Continued)

(58) Field of Classification Search
CPC ............. G01N 15/1436; G03H 1/0443; G03H 1/0465; G03H 1/0866; G03H 2001/0469; G03H 2223/16; G03H 2223/23
See application file for complete search history.

(56) References Cited

U.S. PATENT DOCUMENTS

2010/0128333 A1* 5/2010 Sato ..................... G03H 1/12
359/3
2012/0008482 A1* 1/2012 Bablumyan .............. G03H 1/04
369/103
(Continued)

FOREIGN PATENT DOCUMENTS

EP         2657793 A1   10/2013
WO    2015/167492 A1   11/2015

OTHER PUBLICATIONS

PCT International Search Report and Written Opinion; PCT International Application No. PCT/EP2017/068430, dated Nov. 7, 2017, 16 pages.
(Continued)

*Primary Examiner* — David Bilodeau
(74) *Attorney, Agent, or Firm* — McDonnell Boehnen Hulbert & Berghoff LLP (57) ABSTRACT

Example embodiments relate to an integrated lens-free imaging device. One embodiment includes a lens-free imaging device for imaging a sample. The lens-free imaging device includes a radiation guiding structure that includes a first surface parallel with a second surface. The lens-free imaging device also includes an imaging region. The radiation guiding structure is adapted for receiving an incoming radiation wave, thereby obtaining a confined radiation wave. At least one perturbation is present in the radiation guiding structure for generating, from the confined radiation wave, a first radiation wave and a second radiation wave. The radiation guiding structure is configured to direct the first radiation wave out of the radiation guiding structure toward the first surface to a sample measurement region. The radiation guiding structure is further configured to direct the second radiation wave toward the second surface to the imaging region.

20 Claims, 3 Drawing Sheets

(52) U.S. Cl.
CPC ......... *G03H 1/0465* (2013.01); *G03H 1/0866* (2013.01); *G01N 2015/1454* (2013.01); *G03H 2001/0445* (2013.01); *G03H 2001/0469* (2013.01); *G03H 2223/16* (2013.01); *G03H 2223/23* (2013.01)

(56) References Cited

U.S. PATENT DOCUMENTS

| | | | | |
|---|---|---|---|---|
| 2012/0218379 A1* | 8/2012 | Ozcan | .................. | G03H 1/0866 348/40 |
| 2012/0281197 A1* | 11/2012 | Tharaldsen | ...... | G01N 21/95623 355/71 |
| 2013/0076857 A1* | 3/2013 | Kurashige | .............. | G01B 11/24 348/40 |
| 2013/0093871 A1 | 4/2013 | Nowatzyk et al. | | |
| 2013/0278981 A1* | 10/2013 | Huys | .................... | G03H 1/0443 359/10 |
| 2013/0278982 A1* | 10/2013 | Huys | ........................ | G03H 1/26 359/22 |
| 2013/0293697 A1 | 11/2013 | Sun et al. | | |
| 2014/0340476 A1 | 11/2014 | Sun et al. | | |
| 2016/0015264 A1* | 1/2016 | Pankajakshan | ...... | G03H 1/0866 351/206 |
| 2016/0131882 A1* | 5/2016 | Wallace | ............. | G02B 21/0056 356/458 |
| 2017/0052384 A1* | 2/2017 | Santori | .................. | G01N 21/05 |
| 2017/0322151 A1* | 11/2017 | Kolman | ................ | G03H 1/0443 |
| 2018/0188152 A1* | 7/2018 | Vercruysse | .............. | G02B 6/30 |
| 2018/0275604 A1* | 9/2018 | Lin | ........................ | G02B 30/00 |

OTHER PUBLICATIONS

Kozma, Peter et al., "Integrated Planar Optical Waveguide Interferometer Biosensors: A Comparative Review", Biosensors and Bioelectronics, vol. 58, Feb. 28, 2014, pp. 287-307.

* cited by examiner

INTEGRATED LENS FREE IMAGING DEVICE

CROSS-REFERENCE TO RELATED APPLICATION

The present application is a national stage entry of PCT/EP2017/068430 filed Jul. 20, 2017, which claims priority to EP 16180404.2 filed on Jul. 20, 2016, the contents of each of which are hereby incorporated by reference.

FIELD OF THE DISCLOSURE

The invention disclosure relates to the field of devices and methods for creating holographic images. More specifically it relates to lens-free imaging devices and methods for creating such holographic images.

BACKGROUND

Lens-free imaging (LFI) relies on the illumination of a scene with a known light field and the recording of the interference pattern that the scattering of the scene produces with the reference illumination in the vicinity of an imager.

In digital holographic microscopy, a diffraction pattern, obtained by interference between a reference wave and an object wave which has interacted with an object of interest, may be detected and digitally recorded. By applying a reconstruction algorithm to such a recorded pattern, an image or image signature of the object of interest may be obtained. Coherent or partially coherent light, collimated by a small aperture, may be used to illuminate the object. The pattern may be acquired by a high resolution optoelectronic sensor array. Such a lens-free holographic microscopy setup may produce a hologram of the object with phase information encoded in the images. Lens-free holographic imaging can provide a low-cost technique for imaging small objects, for example, microscopic objects, such as biological cells, because no expensive or complex optical components, such as high-quality optical lenses, are required.

Methods for holographic imaging in biological applications known in the art may be primarily based on an in-line transmission geometry, in which coherent light from a light source illuminates a sample, which may be positioned on a glass substrate, and the diffraction or fringe pattern is recorded on an imager which is positioned on the opposite side of the sample with respect to the light source.

However, holographic imaging using an in-line transmission geometry may not be suitable for imaging non-transparent samples. Furthermore, dense or connected objects, such as biological tissue samples, may prevent the undistorted transmission of a suitable fraction of the wave through the sample in order to form a reference wave component. Therefore, when imaging such a non-transparent or dense sample, a suitable object wave component may be obtained by reflection on the surface of the sample, instead of transmission through the sample.

US20130278981 and US2013278982 propose devices and methods for holographic reflection imaging. Both require a reflective surface. In US20130278981 the sample is between the image sensor and the reflective surface, and in US2013278982 the partially reflective surface is between the sample and the image sensor. In US2013278982 the image sensor is adapted for determining an interference pattern between the radiation wave reflected by the imaging side of the partially reflected surface and the radiation wave reflected by the object under study.

SUMMARY

Some embodiments provide devices and methods for lens-free imaging.

The above is accomplished by a method and device according to the present disclosure.

In a first aspect, embodiments relate to a lens-free imaging device for imaging a sample, the lens-free imaging device comprising a radiation guiding structure integrated in a chip and an imaging region, wherein the radiation guiding structure is adapted for receiving an incoming radiation wave thus obtaining a confined radiation wave in the radiation guiding structure. In some embodiments, this confined radiation wave travels within the radiation guiding structure. The radiation guiding structure is, moreover, adapted for generating, from the confined radiation wave, a first radiation wave and a second radiation wave, the radiation guiding structure being configured for directing the first radiation wave out of the chip to a sample measurement region for allowing interaction between the first radiation wave and the sample when positioned in the sample measurement region, the radiation guiding structure furthermore being configured for directing the second radiation wave toward the imaging region. The radiation guiding structure, the sample measurement region and the imaging region furthermore being configured so that a scattered first radiation wave, scattered by the sample is at least partly captured in the imaging region and can be combined with the second radiation wave for forming an image.

In embodiments of the present the first radiation wave is generated such that it propagates toward a first surface of the radiation guiding structure and the second radiation wave is generated such that it propagates toward a second surface of the radiation guiding structure wherein the first surface is opposite to the second surface.

In some embodiments, radiation scattered by the sample can be measured in combination with a reference radiation wave (the second radiation wave) coming from the radiation guiding structure which is integrated in the lens-free imaging device. In some embodiments, the power and direction of the first radiation wave and of the second radiation wave can be separately controlled. In some embodiments, no reflective surface behind (in view of the radiation guiding structure) the sample is required to obtain a reference radiation wave. This is not required because the reference radiation wave (being the second radiation wave) is emitted internally in the lens-free imaging device. Some embodiments provide a direct reference radiation wave (the second radiation wave) to the imaging region as well as illumination of the sample by the first radiation wave. In some embodiments, the reference radiation wave is generated on chip and directed toward the imaging region. In some embodiments, the second radiation wave interacts with the scattered first radiation wave at the imaging region. In some embodiments, as a result of this interaction, interference patterns are created that impinge on the surface of the imaging region. In some embodiments, the radiation guiding structure and the imaging region can be integrated in one chip and inserting the sample between the radiation guiding structure and the imaging region may not be required. The reason therefore being that the scattered first radiation wave is detected by the imaging region and that a second radiation wave coming from the radiation guiding structure is oriented toward the imaging region.

In some embodiments, some materials can be measured that cannot be measured with alternative lens-free imaging devices which measure the radiation wave which is transmitted through the sample. Some embodiments allow for measurement of non-transparent samples. This is because the scattered first radiation wave is measured instead of the radiation wave which is transmitted through the sample.

In some embodiments, both the radiation guiding structure and the imaging region are integrated in the chip and the radiation guiding structure is configured for directing the second radiation wave within the chip toward the imaging region.

In some embodiments, the lens-free imaging device comprises a sample holder for holding the sample in the sample measurement region, wherein the radiation guiding structure and the sample holder are positioned such that during operation, when a sample is placed in the sample holder, the scattered first radiation wave and the second radiation wave both impinge on the imaging region.

In some embodiments, a correct alignment between the lens-free imaging device and the sample is obtained when placing the sample in the sample holder.

In some embodiments, the lens-free imaging device comprises a shielding, adapted for shielding the sample measurement region in front of the camera from external radiation.

In some embodiments, the measurement sensitivity can be improved by shielding the camera from disturbing external radiation.

In some embodiments, the radiation guiding structure comprises a waveguide for guiding the confined radiation wave (i.e. the radiation wave is confined in the waveguide). The waveguide may comprise one or more diffracting elements, wherein the one or more diffracting elements is/are adapted for redirecting the confined radiation wave in a first direction resulting in the first radiation wave and redirecting the confined radiation wave in a second direction resulting in the second radiation wave. The waveguide is adapted for receiving an incoming radiation wave thus obtaining a radiation wave which is confined in the waveguide. This radiation wave is also referred to as the confined radiation wave. One or more diffracting elements may be positioned along the travelling path of the confined radiation wave, such that, after being guided by the waveguide, the confined radiation wave is redirected in a first direction and a second direction. In case of an elongated waveguide, the confined radiation wave propagates in the length direction of the waveguide. In case of a slab waveguide the confined radiation wave may propagate (spread) in 2D in the slab.

In some embodiments, a radiation wave is confined in a waveguide and can be guided toward one or more diffracting elements positioned in the waveguide. At the diffracting elements the confined radiation wave is diffracted into a first radiation wave and a second radiation wave. The length of the travelling path of the confined radiation wave before being diffracted by the diffracting elements can be selected when designing the lens-free imaging device. As the radiation wave is confined in the waveguide, the length over which the confined radiation wave has to travel can be freely selected. Thus, lens-free imaging devices with different aspect ratios can be designed.

In some embodiments, a waveguide comprising a diffracting element can be used to generate the first radiation wave as well as the second radiation wave. In some embodiments, one diffracting element is sufficient to generate the first radiation wave as well as the second radiation wave. In some embodiments, this second wave as well as the scattered (by the sample) first radiation wave can be detected by the imaging region.

In some embodiments, the diffracting element is a grating coupler adapted for directing the first radiation wave at a front side of the grating coupler and for directing the second radiation wave at a back side of the grating coupler wherein the front side and the back side are opposite sides of the grating coupler.

In some embodiments, one grating coupler is sufficient for emitting the first radiation wave as well as the second radiation wave.

In some embodiments, the radiation guiding structure is a waveguide comprising a first diffracting element and a second diffracting element, wherein the first diffracting element is adapted for diffracting the confined radiation wave in a first direction resulting in the first radiation wave, and wherein the second diffracting element is adapted for diffracting the confined radiation wave in a second direction resulting in the second radiation wave.

In some embodiments, the power, the direction, and the size of the first and the second radiation wave can be individually adapted by design of the first diffracting element and the second diffracting element. In some embodiments, the diffracting element may be a grating coupler.

In some embodiments, the lens-free imaging device furthermore comprises a radiation source providing a coherent incoming radiation wave, for coupling radiation into the radiation guiding structure. The incoming radiation wave may for example be coupled into the radiation guiding structure by using a butt-coupling technique, a diffraction grating or a diffracting structure. The source may for example be a VCSEL.

In some embodiments, the incoming radiation wave, the confined radiation wave, the first radiation wave, and the second radiation wave are coherent. In some embodiments, the direction wherein the first radiation wave is directed and the direction wherein the second radiation wave is directed, may have a component which is substantially orthogonal with respect to the direction of the confined radiation wave. These components may be opposite for the first radiation wave and the second radiation wave.

In some embodiments, the lens-free imaging device comprises a pass-through waveguide or slab waveguide wherein the pass-through waveguide or slab waveguide is adapted for guiding the diffracted first radiation wave toward the imaging region.

In some embodiments, the lens-free imaging device comprises a processing device for processing the data obtainable from the imaging region.

In some embodiments, the lens-free imaging device comprises a memory storage device having stored software code for processing the measured second radiation wave and the scattered first radiation wave by the processing device.

In a second aspect, embodiments relate to a method for imaging a sample, the method comprising:
  positioning the sample in front of a lens-free imaging device,
  receiving an incoming radiation wave in a chip comprising an imaging region and a radiation guiding structure, thus obtaining a confined radiation wave in the radiation guiding structure, and generating, from the confined radiation wave, a first radiation wave and a second radiation wave,
  wherein the first radiation wave is directed out of the radiation guiding structure to a sample measurement region for allowing interaction between the first radiation wave and the sample when positioned in the sample measurement region, wherein the second radiation wave is directed toward an imaging region, at least partly capturing the scattered first radiation wave in the imaging region and combining the scattered first radiation wave and the second radiation wave in the imaging region for forming an image.

In some embodiments, based on the confined radiation wave, the first and second radiation wave are generated and are both coherent. In some embodiments, the second radiation wave can be used as a reference radiation wave (e.g. for creating a holographic image of the sample). Since the first and second radiation wave are separate radiation waves, in some embodiments the direction, power, and spatial distribution of the first and second radiation wave can be separately controlled.

In a third aspect embodiments relate to a diagnostic device for diagnosing a status of an object or a patient, the diagnostic device comprising:

a lens-free imaging device according to example embodiments, for determining a quality or quantity of particles in a flow of a sample of the object or patient, and an output device for providing an output of the lens-free imaging device on which a diagnosis can be based.

In a fourth aspect, embodiments relate to an industrial inspection device for inspecting objects, the industrial inspection device comprising a lens-free imaging device according to example embodiments, for inspecting an object or a flow of objects, and an output device for providing an output of the lens-free imaging device for characterizing the object or flow of objects.

In some embodiments, the industrial detector is adapted for characterizing air quality or for characterizing pollutants or for characterizing air pollen or for characterizing particles.

Some embodiments allow for particle characterization and thus for particle sorting.

Particular aspects are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present embodiment, the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed embodiment requires more features than are expressly recited in each claim. Rather, as the following claims reflect, aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

Where in embodiments reference is made to waves being emitted in opposite directions, reference is made to waves which are propagating away from each other. This does not necessarily mean that the angle between both should be 180°. Smaller angles are also possible.

In a first aspect, the present disclosure relates to a lens-free imaging device for imaging a sample. This lens-free imaging device comprises a radiation guiding structure and an imaging region. According to embodiments, the radiation guiding structure and the imaging region both are integrated in a chip, e.g. a photonics chip. In other embodiments the imaging sensor may be separate from the chip. In that case, during operation, the radiation guiding structure is positioned between the sample and the imaging region. The radiation guiding structure according to embodiments is adapted for receiving an incoming radiation wave thus obtaining a confined radiation wave which is guided by the radiation guiding structure. It furthermore is adapted for generating, from the confined radiation wave, a first radiation wave and a second radiation wave. The radiation guiding structure furthermore is configured for directing the first radiation wave out of the chip to a sample measurement region for allowing interaction between the first radiation wave and the sample when positioned in the sample measurement region. During operation the first radiation wave thus will be transmitted out of the chip and can be oriented toward the sample under study. The first radiation wave is then scattered by the sample and when the sample is correctly positioned the scattered first radiation wave is at least partly received by the imaging region. The radiation guiding structure furthermore is configured for directing the second radiation wave toward the imaging region. In embodiments where the imaging region is integrated in the chip the second radiation wave remains within the chip. The lens-free imaging device is thus designed such that the second radiation wave is also received by the same imaging region. This second radiation wave propagates internally in the chip. The radiation guiding structure, the sample measurement region and the imaging region furthermore are configured so that a scattered first radiation wave, scattered by the sample, is at least partly captured in the imaging region and can be combined with the second radiation wave for forming an image.

According to at least some embodiments, the scattered first radiation wave and the second radiation wave are coherent radiation waves or at least partially coherent radiation waves. The latter is obtained because they stem both from the same incoming radiation wave. In embodiments, multiple wavelengths can be used. In some embodiments, coherent radiation waves are used as this allows to create an interference pattern. Wavelengths used in embodiments may for example be 500 nm, 480 nm, 600 nm, but the imaging devices are not limited thereto. Depending on the sample under study different wavelengths may be used. Radiation waves may be light waves.

In some embodiments, a hologram of the sample can be recorded by the imaging region which measures the scattered first radiation wave on the sample together with the second radiation wave generated by the radiation guiding structure in the direction of the imaging region. The second radiation wave thereby is used as a reference wave.

In some embodiments, the confined radiation wave is split into a first radiation wave and into a second radiation wave and optionally more waves. The first radiation wave is directed out of the lens-free imaging device toward the sample and the second radiation wave is directed toward the imaging region, e.g., directly to the imaging region. In some embodiments, the second radiation wave is directed directly (i.e. without any additional reflections) toward the imaging region.

In at least some embodiments, the power of the first radiation wave is higher than the power of the second (reference) radiation wave. The reason therefore being that only the scattered first radiation wave is measured by the imaging region. The power of the scattered first radiation wave, scattered in a certain direction, is significantly lower than the power of the first radiation wave. To compensate for this reduction in power, the radiation guiding structure may be designed such that the first radiation wave has a higher power than the power of the second radiation wave.

In some embodiments, the radiation guiding structure is adapted for emitting the first radiation wave toward the sample measurement region and the second radiation wave toward the imaging region. This allows to integrate the radiation guiding structure and the imaging region in one chip. In some embodiments, it is possible to put the sample to be measured on top of the lens-free imaging device or, for example, on a glass in front of the lens-free imaging device. The imaging region may then be located at the opposite side of the lens-free imaging device.

In some embodiments, the lens-free imaging device is configured such that for imaging of the sample, the radiation guiding structure is between the imaging region and the sample.

In some embodiments, the radiation guiding structure comprises a waveguide. The type of waveguide may be any type of waveguide, such as for example a rigid waveguide, a slab waveguide, . . . . A radiation source such as a LED, a VCSEL or a laser may be connected to the waveguide. In some embodiments, the radiation source may be integrated in the chip. Such integration may be monolithically, heterogeneous or hybridly.

The imaging region may for example comprise an image sensor. This may be a CMOS image sensor, or a III-V imager (e.g. gallium arsenide sensor), or a bolometer. Also here the type of image sensor may be dependent on the sample under study and the wavelength used for studying the sample. The image sensor may comprise a plurality of sensors, it may for example be an array of sensors. In some embodiments, the second radiation wave illuminates the complete area of the image sensor. In some embodiments, this area may for example be 1 cm².

The lens-free imaging device according to embodiments is configured such that the second radiation wave is illuminating a part or even all of the pixels of the image sensor. Therefore the lens-free imaging device may comprise a diffracting element or more than one diffracting element (e.g. a different diffracting element for the first radiation wave than for the second radiation wave) or the first radiation wave may be diffracted from a different side of the diffracting element that the second radiation wave. Thus, in some embodiments, the first radiation wave and the second radiation wave can be shaped differently by the design of the one or more diffracting elements. Depending on the diffracting element different beam shapes can be obtained. The diffracting element may be a grating. A pseudo random pattern of scatterers may be used. A grating thereby may be seen as an ordened set of scatterers which diffracts in a preferred direction.

Embodiments may comprise a diffracting element as well as a focusing element for focusing the first and/or second waveguide toward a point. This may for example be a point in the sample measurement region. A grating may be adapted such that it can serve as focusing element.

In some embodiments, the radiation guiding structure 110 comprises a waveguide 111 comprising a first surface 115 parallel with a second surface 117. The radiation guiding structure is adapted for receiving the incoming radiation wave thus obtaining a confined radiation wave. This confined radiation wave is confined in the waveguide between the first surface and the second surface by total internal reflection of the confined radiation wave at the first and second surface resulting in an overall propagation of the confined radiation wave in a direction parallel with both surfaces. In some embodiments, the propagation vectors of the confined radiation wave within the waveguides are such that they are incident on the surfaces in a shallow enough manner so as to maintain total internal reflection. In some embodiments, the confinement within the radiation guiding structure may be in two directions, both in the lateral direction as in the vertical direction (e.g. for the mode which is selected; e.g. TE, TM). In some embodiments, the mode remains in the radiation guiding structure even if a bend is present in the radiation guiding structure.

The confined radiation wave propagates through the radiation guiding structure up to a point where it is redirected in a first direction and/or in a second direction (e.g. using a diffracting element). In some embodiments, the radiation guiding structure 110 is configured for directing the first radiation wave 114 out of the radiation guiding structure 110 via the first surface 115, and the second radiation wave 116 out of the radiation guiding structure 110 via the second surface 117.

Figure 1:
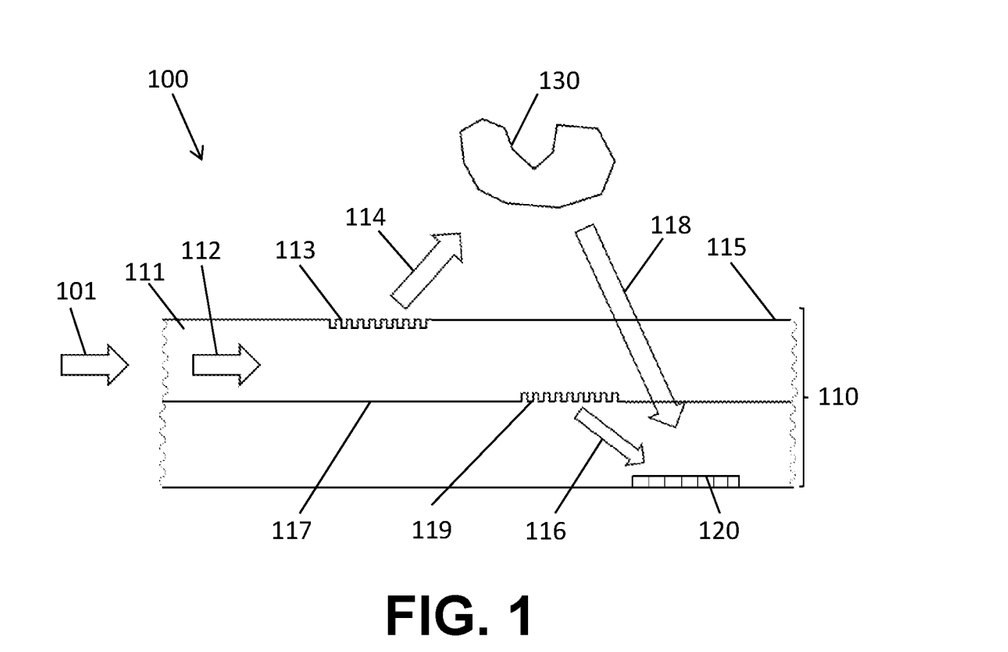
FIG. 1 shows a schematic drawing of a lens-free imaging device comprising a first scattering element and a second scattering element, according to example embodiments.

FIG. 1 shows a schematic drawing of a lens-free imaging device 100 in accordance with embodiments. The lens-free imaging device comprises a light emitting structure 110 comprising a waveguide 111 for receiving an incoming radiation wave 101 and for guiding a confined radiation wave 112, a first diffracting element 113 (in the first surface 115) and a second diffracting element 119 (in the second surface 117) integrated in the waveguide 111. The waveguide 111 is oriented parallel with the surface of the chip of the lens-free imaging device 100. The lens-free imaging device 100 is thus integrated in a chip. The waveguide 111 comprises a first surface 115 and a second surface 117. A first diffracting element 113 is integrated in the first surface 115 and is adapted for splitting of a part of the confined light wave 112 resulting in a first light wave 114 oriented toward the sample 130. A second diffracting element 119 is integrated in the second surface 119 and is adapted for splitting of a part of the confined light wave 112 resulting in the second light wave 116. The second light wave is oriented toward the image sensor 120 and may illuminate all pixels of the image sensor 120. In this and the following figures the radiation waves indicated by the arrows are the radiation waves which are used in the example embodiments illustrated in these figures. Additional radiation waves may be present. The first diffracting element of FIG. 1 may for example also diffract a downward radiation wave, and the second diffracting element 119 may for example also diffract an upward radiation wave. When referring to the diffracting element and the radiation waves, the terms first and second are used. This is for distinguishing between them. It does not imply a time or spatial relationship between them. The imaging region 120 is integrated in the same chip as the scattering elements 113, 119. The first diffracting element 113 and the imaging region 120 are positioned such that it is possible to put a sample 130 in front of the lens-free imaging device whereby the first radiation wave 114 is directed on the sample 130 resulting in a scattered first radiation wave 118 and whereby the diffracted first radiation wave 118 is emitted toward the imaging region 120.

Figure 5:
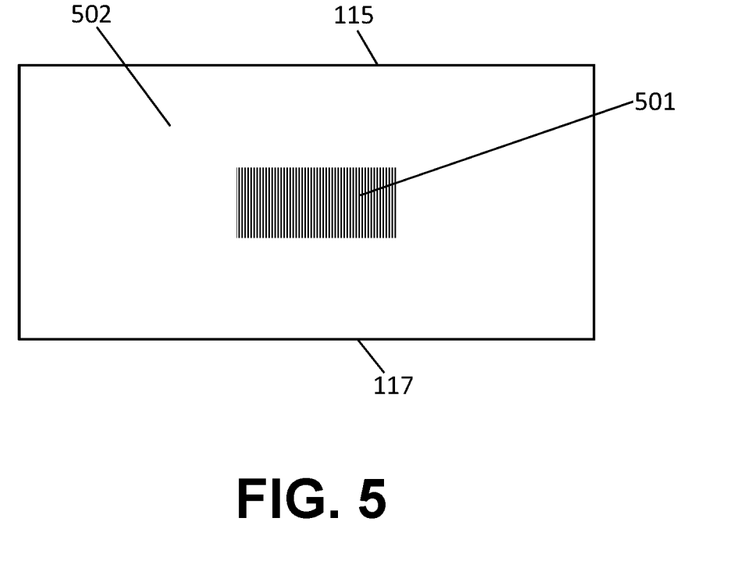
FIG. 5 is a schematic drawing of a cross-section of a radiation guiding structure of a lens-free imaging device, according to example embodiments.
Figure 6:
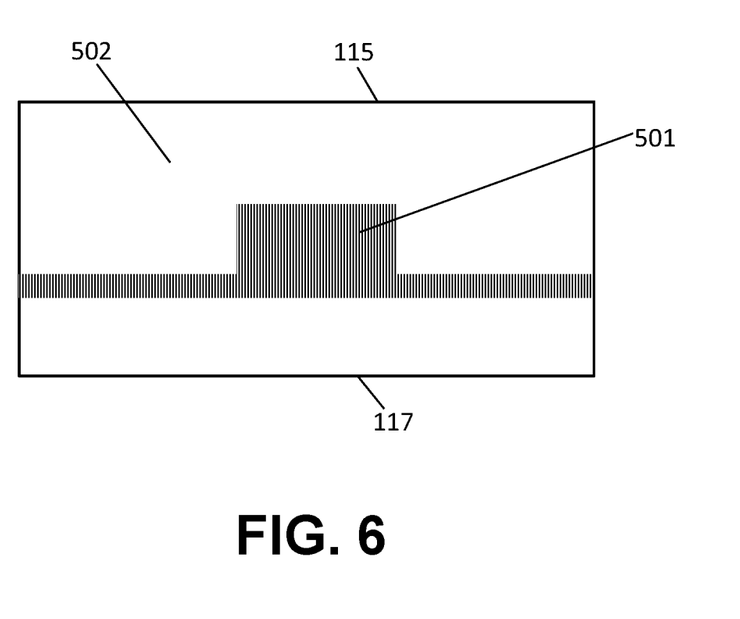
FIG. 6 is a schematic drawing of a cross-section of a radiation guiding structure of a lens-free imaging device, according to example embodiments.

In some embodiments, the thickness (between the first surface and the second surface) of the radiation guiding structure may be between 1 μm and 100 μm, for example between 4 μm and 6 μm, for example 5 μm. FIG. 6 are schematic drawings of a cross-section of a radiation guiding structure 110 comprising a waveguide core 501 and a waveguide cladding 502. In the figures the first surface 115 and the second surface 116 are indicated. In FIG. 5 the waveguide core is rectangular. In FIG. 6 part of the waveguide core extends (in a direction parallel with the first surface and the second surface) to the edges of the waveguide.

The first and second waves may be generated by a perturbation present in the radiation guiding structure. This perturbation may be located at the first surface (such as for example on top of the first surface), at the second surface (such as for example on top of the second surface), or anywhere in between the first surface and the second surface.

Figure 2:
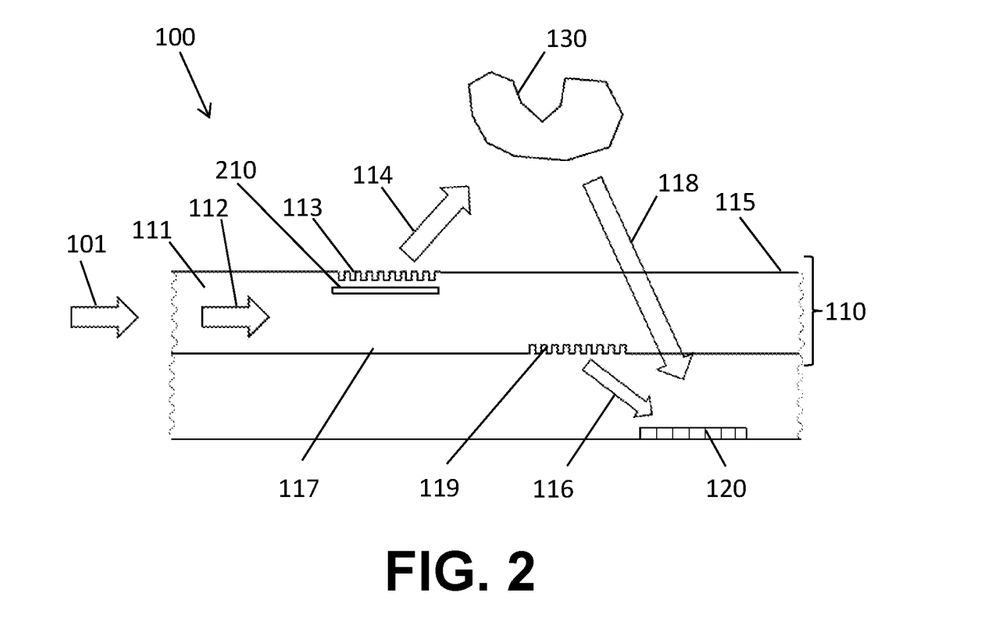
FIG. 2 shows a schematic drawing of a similar lens-free imaging device as in FIG. 1, the lens-free imaging device comprising a reflective element at the back side of the first scattering element, according to example embodiments.

FIG. 2 shows a schematic drawing of a similar lens-free imaging device 100 as in FIG. 1. The lens-free imaging device 100 comprising a reflective element 210 at the back side of the first scattering element 113 (in the first surface 115), in accordance with embodiments. The back side of the first diffracting element 113 is the side of the first diffracting element opposite to the side where the first radiation wave 114 is generated. The reflective element reduces the radiation that is scattered from the back side of the first diffracting element 113.

Figure 3:
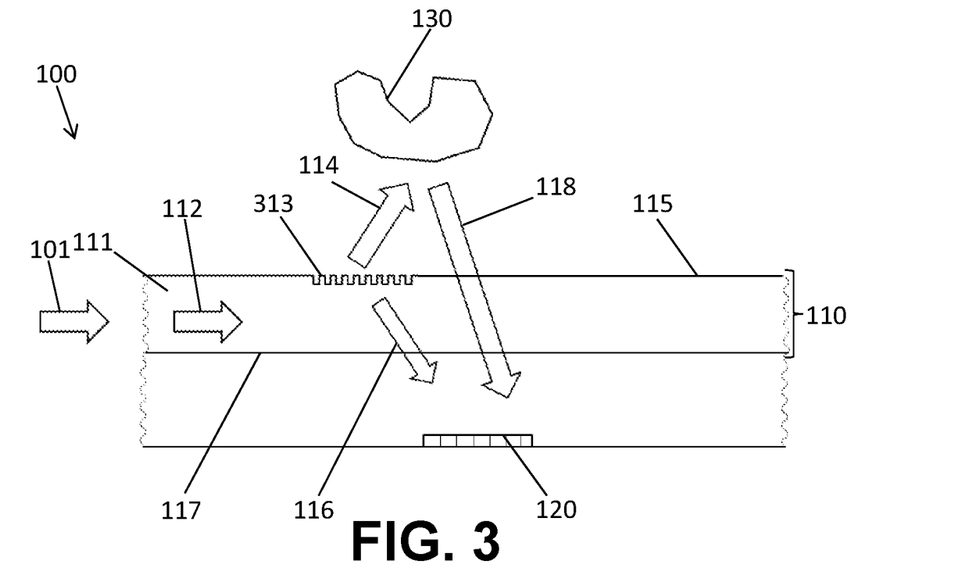
FIG. 3 shows a schematic drawing of a lens-free imaging device comprising a scattering element adapted for generating a first radiation wave and a second radiation wave, according to example embodiments.

FIG. 3 shows a schematic drawing of a lens-free imaging device 100 comprising a diffracting element 313 (in the first surface 115) adapted for generating a first radiation wave 114 and a second radiation wave 116, in accordance with embodiments. The lens-free imaging device 100 of this example is similar as the lens-free imaging device 100 illustrated in FIG. 1, except that in this example there is only one diffracting element. The diffracting element splits the confined radiation wave 112 in two directions. A first radiation wave 114 toward the sample 130 and a second radiation wave 116 toward the imaging region 120.

In some embodiments, a waveguide 111 can be situated between the imaging region 120 and the sample 130 being imaged. A confined light wave supplied via the waveguide or slab is emitted from the waveguide by a grating coupler 313 (or for example by a nano-photonic antenna array, or by a sea of scatterers) toward the sample to be illuminated (the first radiation wave). In some embodiments, the grating coupler 313 also reflects the confined light wave in the opposite direction (e.g. due, in part, to unwanted reflection) resulting in a second radiation wave 116 from the surface of the waveguide opposite the grating toward the imaging region 120. This second radiation wave 116 is closely matched, i.e. coherent or at least partially coherent, to the first radiation wave 114. The second radiation wave thus can serve as a reference radiation wave.

In some embodiments, the directing upwards (the first radiation wave) may be almost matched with the directing downwards (the second radiation wave). In some embodiments, this downwards directed can be used as a reference beam. This may be unlike alternative lens-free imaging devices that measure the transmission through the sample (e.g., in alternative devices, downwards scattering may be required).

Figure 4:
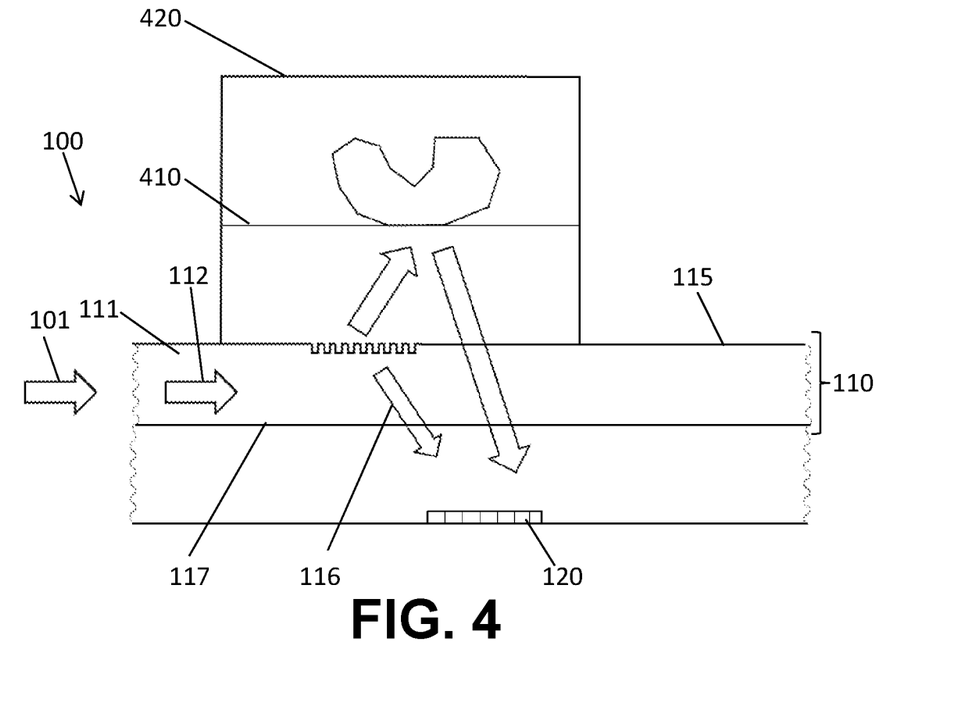
FIG. 4 shows a schematic drawing of a similar lens-free imaging device as in FIG. 3, the lens-free imaging device comprising a shielding and a sample holder, according to example embodiments.

FIG. 4 shows a schematic drawing of a similar lens-free imaging device 100 as in FIG. 3. The lens-free imaging device comprises a shielding 420 and a sample holder 410 in accordance with embodiments. The sample holder 410 may be a glass shielding preventing direct contact between the chip and the sample. The sample holder may be constructed such that, when the sample is positioned in the sample holder, the sample is in the correct position for scattering the first radiation wave 114 (in the first surface 115) such that the scattered first radiation wave 118 is, at least partly, captured by the imaging region 120.

Additionally different splitters may be used to such that the imaging region is at least partly or even completely illuminated by the second radiation wave. The radiation guiding structure may be designed such that during operation the first radiation wave is radiating more than 50% or even more than 70%, or even more than 90% or even the complete surface, of the imaging region (e.g. by using a sea of scatter elements or by using a taper structure). In case of an image sensor, the illumination of the image sensor may be realized by a slab wherein dots are present on top of each pixel to locally illuminate each pixel.

By increasing the number of pixels of the image sensor the accuracy of the lens-free imaging device can be increased.

The second radiation wave may be transmitted straight from the radiation guiding structure to the imaging region. However different techniques may be used for directing the second radiation wave to the imaging region.

Lens-free imaging devices according to the present disclosure may comprise a memory storage device on which an algorithm is stored. This algorithm can run on a processing device to process the data obtained by the image sensor.

Lens-free imaging devices according to the present disclosure may for example be applied for imaging cells in blood. The blood sample may be put directly on top of the imaging device. Alternatively a glass sheet or another spacer may separate the lens-free imaging device and the sample to be measured. In some embodiments, direct contact between the imaging device and the sample may be avoided, thereby preventing damage of the imaging device by the sample. In some embodiments, the lens-free imaging device may comprise a microfluidics device for guiding the sample at the predetermined position in front of the imaging region. The predetermined position is that position wherein the first radiation wave is hitting the sample thus resulting in a scattered first radiation wave and wherein the scattered first radiation wave is impinging on the imaging region.

Another application for imaging devices according to the present disclosure may be non-destructive testing, for example for imaging a metal surface. In some embodiments, the scattered radiation wave may be imaged. Indeed, alternative lens-free imaging devices that are measuring in transmission cannot be applied for such tests in case the object under test is an opaque object (e.g. a metal surface). Some embodiments provide for this using a lens-free imaging device that images the sample in reflection.

In a second aspect, the disclosure relates to a method for imaging a sample.

Such a method may comprise a first step wherein the sample is put in front of a lens-free imaging device Such a method further comprises a second step wherein a first and a second radiation wave are generated based on a confined radiation wave. The directions of the first and the second radiation wave are different from the direction of the confined radiation wave. The first and second radiation wave are coherent. In the second step the radiation waves are emitted such that the second radiation wave is directed toward an imaging region and such that the first radiation wave is illuminating the sample resulting a scattered first radiation wave. In a method according to example embodiments, the sample is positioned such that the scattered first radiation wave is at least partly received by the imaging region. The method according to example embodiments combines the scattered first radiation wave and the second radiation wave in the imaging region for forming an image. In example embodiments the first radiation wave and the second radiation wave may have a component which is substantially orthogonal with respect to the direction of the confined radiation wave. These components may be opposite for the first radiation wave and the second radiation wave.

The invention claimed is:

1. A lens-free imaging device for imaging a sample, the lens-free imaging device comprising:
   an imaging region; and
   a radiation guiding structure proximate the imaging region and configured to receive an incoming radiation wave, the radiation guiding structure comprising:
      first and second parallel surfaces configured to confine and propagate the incoming radiation wave in a direction parallel to the first surface and the second surface via total internal reflection of the incoming radiation wave by the first surface and the second surface; and
      at least one perturbation on the first surface, wherein the at least one perturbation is configured to direct a first radiation wave towards a sample measurement region proximate the first surface, and to direct a second radiation wave towards the imaging region,
   wherein when a sample is in the sample measurement region, the sample scatters and reflects the first radiation wave towards the imaging region, wherein the scattered and reflected wave is at least partly captured in the imaging region and is combinable with the second radiation wave for forming an image.

2. The lens-free imaging device according to claim 1, wherein both the radiation guiding structure and the imaging region are integrated in a chip, and wherein the radiation guiding structure is configured to direct the second radiation wave within the chip toward the imaging region.

3. The lens-free imaging device according to claim 1, further comprising a sample holder for holding the sample in the sample measurement region, wherein the radiation guiding structure and the sample holder are positioned such that, during operation, when a sample is placed in the sample holder, the scattered first radiation wave and the second radiation wave both impinge on the imaging region.

4. The lens-free imaging device according to claim 1, further comprising a shielding configured to shield the sample measurement region from external radiation.

5. The lens-free imaging device according to claim 1,
wherein the radiation guiding structure comprises a waveguide for guiding a confined radiation wave,
wherein the waveguide comprises a diffracting element, and
wherein the diffracting element is configured to redirect a portion of the confined radiation wave in a first direction resulting in the first radiation wave and redirect another portion of the confined radiation wave in a second direction resulting in the second radiation wave.

6. The lens-free imaging device according to claim 5,
wherein the diffracting element is a grating coupler adapted for directing the first radiation wave at a front side of the grating coupler and for directing the second radiation wave at a back side of the grating coupler, and
wherein the front side and the back side are opposite sides of the grating coupler.

7. The lens-free imaging device according to claim 1,
wherein the radiation guiding structure is a waveguide comprising a first diffracting element and a second diffracting element,
wherein the first diffracting element is configured to diffract a portion of a confined radiation wave in a first direction resulting in the first radiation wave, and
wherein the second diffracting element is configured to diffract another portion of the confined radiation wave in a second direction resulting in the second radiation wave.

8. The lens-free imaging device according to claim 1, further comprising a radiation source providing a coherent incoming radiation wave, for coupling radiation into the radiation guiding structure.

9. The lens-free imaging device according to claim 1, wherein the direction in which the first radiation wave is directed and the direction in which the second radiation wave is directed are substantially opposite with respect to the direction of a confined radiation wave.

10. The lens-free imaging device according to claim 1, further comprising a pass-through waveguide or a slab waveguide, wherein the pass-through waveguide or the slab waveguide is configured to guide the first radiation wave toward the imaging region.

11. The lens-free imaging device according to claim 1, further comprising a processing device for processing data obtainable from the imaging region.

12. A method for imaging a sample, the method comprising:
positioning the sample in front of a lens-free imaging device,
receiving an incoming radiation wave in a radiation guiding structure, thereby obtaining a confined radiation wave in the radiation guiding structure by total internal reflection at a first surface and a second parallel surface of the radiation guiding structure resulting in an overall propagation of the confined radiation wave in a direction parallel with both the first surface and the second surface;
generating, via at least one perturbation on the first surface and from the confined radiation wave, a first radiation wave and a second radiation wave such that the first radiation wave propagates toward the first surface and the second radiation wave propagates toward the second surface,
wherein the first radiation wave is directed out of the radiation guiding structure to a sample measurement region that allows interaction between the first radiation wave and the sample when positioned in the sample measurement region, and
wherein the second radiation wave is directed toward an imaging region;
capturing, at least partly, the first radiation wave in the imaging region; and
combining the first radiation wave and the second radiation wave in the imaging region an image.

13. The lens-free imaging device according to claim 1,
wherein the lens-free imaging device is a component of a diagnostic device for diagnosing a status of an object or a patient,
wherein the lens-free imaging device is configured to determine a quality or quantity of particles in a flow of a sample of the object or the patient, and
wherein the diagnostic device comprises an output device configured to provide an output of the lens-free imaging device on which a diagnosis can be based.

14. An industrial inspection device for inspecting objects, the industrial inspection device comprising:
a lens-free imaging device configured to inspect an object or a flow of objects; and
an output device for providing an output of the lens-free imaging device for characterizing the object or the flow of objects,
wherein the lens-free imaging device comprises:
an imaging region; and
a radiation guiding structure proximate the imaging region and configured to receive an incoming radiation wave, the radiation guiding structure comprising first and second parallel surfaces configured to confine and propagate the incoming radiation wave in a direction parallel to the first surface and the second surface via total internal reflection of the incoming radiation wave by the first surface and the second surface; and
at least one perturbation on the first surface, wherein the at least one perturbation is configured to direct a first radiation wave towards a sample measurement region proximate the first surface, and to direct a second radiation wave towards the imaging region,
wherein when a sample is in the sample measurement region, the sample scatters and reflects the first radiation wave towards the imaging region, wherein the scattered and reflected wave is at least partly captured in the imaging region and is combinable with the second radiation wave for forming an image.

15. The industrial inspection device according to claim 14, wherein the industrial inspection device is configured to characterize one or more of: air quality, pollutants, air pollen, or particles.

16. The industrial inspection device according to claim 14, wherein both the radiation guiding structure and the imaging region are integrated in a chip, and wherein the radiation guiding structure is configured to direct the second radiation wave within the chip toward the imaging region.

17. The industrial inspection device according to claim 14, wherein the lens-free imaging device further comprises a shielding configured to shield the sample measurement region from external radiation.

18. The industrial inspection device according to claim 14, wherein the radiation guiding structure comprises a waveguide for guiding a confined radiation wave, wherein the waveguide comprises a diffracting element, and wherein the diffracting element is configured to redirect a first portion of the confined radiation wave in a first direction resulting in the first radiation wave and redirect another portion of the confined radiation wave in a second direction resulting in the second radiation wave.

19. The industrial inspection device according to claim 18, wherein the diffracting element is a grating coupler configured to direct the first radiation wave at a front side of the grating coupler and to direct the second radiation wave at a back side of the grating coupler, and wherein the front side and the back side are opposite sides of the grating coupler.

20. The industrial inspection device according to claim 14, wherein the lens-free imaging device further comprises a radiation source providing a coherent incoming radiation wave, for coupling radiation into the radiation guiding structure.

* * * * *